United States Patent [19]

Harrow et al.

[11] Patent Number: 5,731,806
[45] Date of Patent: Mar. 24, 1998

[54] INTERRUPT BASED POSITIONING SYSTEM FOR JOYSTICKS AND METHOD THEREFOR

[75] Inventors: Scott E. Harrow, Scottsdale; Rishi Nalubola, Phoenix; Franklyn H. Story, Chandler, all of Ariz.

[73] Assignee: VLSI Technology, Inc., San Jose, Calif.

[21] Appl. No.: 710,779

[22] Filed: Sep. 20, 1996

[51] Int. Cl.$^6$ .................................................. G09G 5/08
[52] U.S. Cl. .............................................. 345/161; 345/162
[58] Field of Search ...................................... 345/156, 161, 345/162, 163, 157; 463/36, 37, 38; 273/148 B

[56] References Cited

U.S. PATENT DOCUMENTS 4,721,308  1/1988  Trimble ................................. 345/156
5,261,054  11/1993  Lerner et al. ......................... 345/163
5,593,350  1/1997  Bouton et al. ...................... 273/148 B

*Primary Examiner*—Raymond J. Bayerl
*Assistant Examiner*—Matthew Luu
*Attorney, Agent, or Firm*—Harry M. Weiss; Jeffrey D. Moy; Harry M. Weiss & Associates, P.C.

[57] ABSTRACT

An interrupt based positioning system for a joystick. A potentiometer is coupled to the joystick for supplying a voltage signal representative of a current position of the joystick. An analog-to-digital converter changes the voltage signal to a digital voltage signal which is then stored in a register. Interrupt generation logic monitors the output of the register and generates a position interrupt signal when the digital voltage signal stored in the register indicates a change in the axial position of the joystick.

20 Claims, 1 Drawing Sheet

INTERRUPT BASED POSITIONING SYSTEM FOR JOYSTICKS AND METHOD THEREFOR

BACKGROUND OF THE INVENTION

1. Field of the Invention

This invention relates to computer systems and, more specifically, to an interrupt based joystick positioning system for use with both analog based and digital based joysticks and method therefor.

2. Description of the Prior Art

Currently, most computer games are developed using programs which interface with one or more "joysticks". The joysticks are polled in order to resolve the current joystick axes position and button status. The movement of each joystick is monitored by one or more potentiometers. The joystick swings through a range on the potentiometer which is used to set a time delay of a one-shot multi-vibrator. Generally, four orthogonally arranged potentiometers are used per joystick to obtain four related axial settings. Each of the axial settings sets a separate one-shot multi-vibrator to establish a different time delay.

The problem with current joysticks is that the accuracy of the potentiometer output readout may be imprecise or inconsistent due to the multi-vibrator. The readings vary particularly with changes in temperature and with inherent variations in components during manufacture. Furthermore, a relatively large component count is required for each multi-vibrator. But perhaps the biggest problem with current joystick systems is that a large amount of bus cycles are consumed by intense software loops which continuously poll the joystick system in order to determine the current axial position and button status of the joystick. If less bus cycles are consumed, the saved bus cycles could be used for other operations within the computer system thereby increasing system performance.

Therefore, a need existed to provide an improved joystick positioning system and method therefor. The improved system must consistently produce an accurate indication of the current joystick position. The system must reduce the peripheral bus overhead associated with traditional joysticks. The improved system will allow the joystick position and button status to be interrupt driven thereby reducing peripheral bus overhead by reducing the number of peripheral bus cycles required to obtain complete information about the joystick position and button status.

SUMMARY OF THE INVENTION

In accordance with one embodiment of the present invention, it is an object of the present invention to provide an improved joystick positioning system and method therefor.

It is another object of the present invention to provide an improved joystick positioning system and method therefor that will reduce the peripheral bus overhead associated with traditional joysticks.

It is still another object of the present invention to provide an improved joystick positioning system and method therefor that will allow the joystick position and button status to be interrupt driven thereby reducing peripheral bus overhead by reducing the number of peripheral bus cycles required to obtain complete information about the joystick position and button status.

BRIEF DESCRIPTION OF THE PREFERRED EMBODIMENTS

In accordance with one embodiment of the present invention, an interrupt based positioning system for a joystick is disclosed. The positioning system is comprised of a plurality of elements one of which is potentiometer means. The potentiometer means are coupled to the joystick for supplying a voltage signal representative of a current position of the joystick. Analog-to-Digital (A/D) converter means are coupled to an output of the potentiometer means for converting the voltage signal to a present digital voltage signal. Register means are coupled to an output of the A/D converter means for storing the present digital voltage signal outputted by the A/D converter means. Interrupt generation means are coupled to an output of the register means for sending a position interrupt signal when the present digital voltage signal stored in the register means indicates a change in position of the joystick.

In accordance with another embodiment of the present invention, a method of providing an interrupt based positioning system for a joystick is disclosed. The method comprises the steps of: providing a plurality of potentiometer means each of the plurality of potentiometer means are coupled to the joystick for supplying an individual present voltage signal representative of a current axial position of the joystick; providing multiplexer means coupled to an output of each of the plurality of potentiometer means for sampling each individual present voltage signal from each of the plurality of potentiometer means; providing analog-to-digital (A/D) converter means coupled to an output of the multiplexer means for converting each individual present voltage signal from each of the plurality of potentiometer means to an individual present digital voltage signal; providing a plurality of register means equal in number to the plurality of potentiometer means each of the plurality of register means being coupled to the A/D converter means for storing one individual present digital voltage signal representative of one individual present voltage signal from one of the plurality of potentiometer means; and providing interrupt generation means coupled to an output of each of the plurality of register means for sending a position interrupt signal when one present digital voltage signal stored in one of the plurality of register means indicates a change in position of the joystick.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENT

Figure 1:
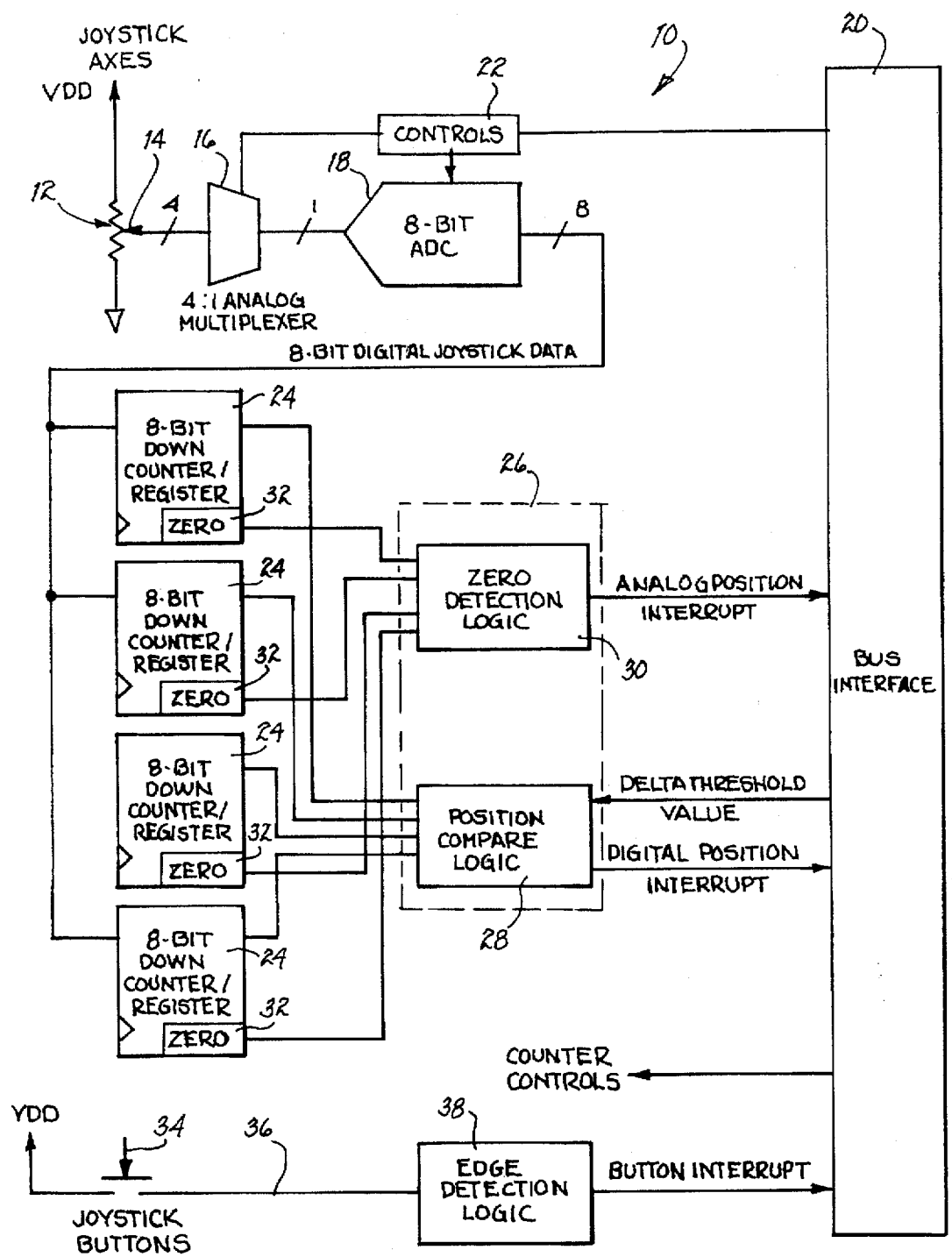
FIG. 1 is a simplified functional block diagram of the interrupt based positioning system for analog/digital based joysticks.

Referring to FIG. 1, an interrupt based positioning system for a joystick 10 (hereinafter system 10) is shown. The system 10 uses one or more potentiometers 12. The potentiometer 12 is connected between a voltage supply source $V_{DD}$ and ground. The position of a slider 14 of the potentiometer 12 causes a voltage to be supplied which is representative of a position between the maximum supply voltage $V_{DD}$ and the ground potential. The voltage signal output from the potentiometer 12 is used to indicate the current position of the joystick.

In the preferred embodiment of the present invention, four orthogonally arranged potentiometers 12 are used in order to generate four analog voltage signals which represent the axial position of the joystick. The outputs from each of the potentiometers 12 is supplied to a multiplexer 16. The multiplexer 16 samples the individual voltage signals from each of the potentiometers 12 and sends the voltage signals to an Analog-to-Digital (A/D) converter 18.

In the preferred embodiment of the present invention, the A/D converter 18 is an eight-bit A/D converter. The eight-bit A/D converter 18 continuously provides an eight-bit digital output signal representative of the different voltages supplied to it from the multiplexer 16.

For computer games, when the position of the joystick is to be utilized, a game write pulse is generated. The game write pulse is sent over the bus interface 20 to the control unit 22. When a game write pulse is provided to the control unit 22, the control unit 22 signals the eight-bit A/D converter 18 to transfer the eight-bit digital output signal to a register 24.

The register 24 is used for storing the digital output signals from the A/D converter 18. In the preferred embodiment of the present invention, the register 24 is an eight-bit storage register. As can be seen from FIG. 1, four registers 24 are provided in the system 10. Each of the registers 24 corresponds to a specific potentiometer 12. Thus, each register 24 stores the digital output signal of a specific potentiometer 12 and hence a specific axial position of the joystick.

Interrupt generation logic 26 is coupled to outputs from the registers 24. The interrupt generation logic 26 is used for sending a position interrupt signal when a digital output signal stored in any of the registers 24 indicates a change in the axial position of the joystick.

The interrupt generation logic 26 is comprised of position compare logic block 28 and zero detection logic block 30. If the joystick is operating under a digital mode, each time a game write pulse loads a new digital output signal into one of the registers 24, the position compare logic 28 will compare the new digital output signal with a previous digital output signal that was stored in that specific register 24. If the difference between the new and the old digital output signal is greater than a threshold value, a position interrupt signal is generated and sent to the bus interface 20 indicating that the joystick has changed positions.

If the joystick is operating under an analog mode, each of the registers 24 must be supplied with a countdown timer 32. Each time a game write pulse loads a new digital output signal into one of the registers 24, the countdown timer 32 of that specific register 24 will count down to an initial starting value. When that initial starting value is obtained, a signal is sent to the zero detection logic block 26. The zero detection logic block will then generate a position interrupt signal which is sent to the bus interface 20 indicating that the joystick has changed positions.

The system 10 is also capable of generating a button interrupt signal any time a joystick button 34 is depressed. Each joystick button 34 is generally coupled to a voltage supply source $V_{DD}$. When the joystick button is depressed, a voltage signal is supplied across signal line 36. An edge detection logic block 40 is coupled to and reads the signal line 36. If the voltage signal is in a high state, the edge detection logic block 40 will send a button interrupt signal to the bus interface 20 signalling the bus interface that the button 34 has been depressed. If the voltage signal is in a low state, the edge detection logic block assumes that the joystick button 34 has not been depressed and no button interrupt signal will be generated. Thus, the edge detection logic block 38 does away with the continuous polling of the signal line 36 to determine if the joystick button 34 has been depressed.

While the invention has been particularly shown and described with reference to a preferred embodiment thereof, it should be understood by those skilled in the art that changes in form and detail may be made therein without departing from the spirit and scope of the invention.

What is claimed is:

1. An interrupt based positioning system for a joystick comprising, in combination:

potentiometer means coupled to said joystick for supplying a voltage signal representative of a current position of said joystick;

analog-to-digital (A/D) converter means coupled to an output of said potentiometer means for converting said voltage signal to a present digital voltage signal;

register means coupled to an output of said A/D converter means for storing said present digital voltage signal outputted by said A/D converter means;

interrupt generation means coupled to an output of said register means for sending a position interrupt signal when said present digital voltage signal stored in said register means indicates a change in position of said joystick; and counter means coupled to said register means for counting down from said present digital voltage signal stored in said register means to an initial value and for producing an output signal to generate said position interrupt signal when said initial value is obtained.

2. An interrupt based positioning system for a joystick in accordance with claim 1 wherein said interrupt generation means comprises position compare logic means for comparing a successive value stored in said register means with said present digital voltage signal and for sending said position interrupt signal when a difference between said successive value and said present digital voltage signal exceeds a predetermined threshold value.

3. An interrupt based positioning system for a joystick in accordance with claim 2 further comprising edge detection means coupled to said joystick for sending a button interrupt signal when a joystick button changes status.

4. An interrupt based positioning system for a joystick in accordance with claim 1 wherein said interrupt generation means comprises zero detection logic means for receiving said output signal from said counter means and for outputting said position interrupt signal when said counter means reaches said initial value indicating a change in position of said joystick.

5. An interrupt based positioning system for a joystick in accordance with claim 4 further comprising edge detection means coupled to said joystick for sending a button interrupt signal when a joystick button changes status.

6. An interrupt based positioning system for a joystick in accordance with claim 1 wherein said potentiometer means comprises a plurality of potentiometer means each of said plurality of potentiometer means coupled to said joystick for supplying an individual present voltage signal representative of a current axial position of said joystick.

7. An interrupt based positioning system for a joystick in accordance with claim 6 further comprising multiplexer means coupled to an output of each of said plurality of potentiometer means for sampling each of said individual present voltage signal from each of said plurality of potentiometer means and for sending each of said individual present voltage signal to said A/D converter means.

8. An interrupt based positioning system for a joystick in accordance with claim 7 wherein said register means comprises a plurality of register means equal in number to said plurality of potentiometer means each of said plurality of register means being used for storing an individual digital voltage signal outputted by said A/D converter means representative of one of said individual present voltage signal from one of said plurality of potentiometer means.

9. An interrupt based positioning system for a joystick in accordance with claim 8 wherein said interrupt generation means comprises position compare logic means coupled to each of said plurality of register means for computing differences between a successive value stored in each of said plurality of register means and said individual digital voltage signal stored in each of said plurality of register means and for sending said position interrupt signal when at least one of said differences exceeds a predetermined threshold value.

10. An interrupt based positioning system for a joystick in accordance with claim 9 further comprising edge detection means coupled to said joystick for sending a button interrupt signal when a joystick button changes status.

11. An interrupt based positioning system for a joystick in accordance with claim 8 further comprising a plurality of counter means equal in number to said plurality of register means wherein one of said plurality of counter means is coupled to each individual register means of said plurality of register means for counting down from said present digital voltage signal stored in each of said plurality of register means to an initial value and for producing an output signal to generate said position interrupt signal when said initial value is obtained.

12. An interrupt based positioning system for a joystick in accordance with claim 11 wherein said interrupt generation means comprises zero detection logic means coupled to an output of each of said plurality of counter means for receiving said output signal from each of said plurality of counter means and for outputting said position interrupt signal when any of said plurality of counter means reaches said initial value indicating a change in position of said joystick.

13. An interrupt based positioning system for a joystick in accordance with claim 12 further comprising edge detection means coupled to said joystick for sending a button interrupt signal when a joystick button changes status.

14. An interrupt based positioning system for a joystick comprising, in combination:
   a plurality of potentiometer means each of said plurality of potentiometer means coupled to said joystick for supplying an individual present voltage signal representative of a current axial position of said joystick;
   multiplexer means coupled to an output of each of said plurality of potentiometer means for sampling each of said individual present voltage signal from each of said plurality of potentiometer means;
   analog-to-digital (A/D) converter means coupled to an output of said multiplexer means for converting each of said individual present voltage signal from each of said potentiometer means to an individual present digital voltage signal;
   a plurality of register means equal in number to said plurality of potentiometer means each of said plurality of register means being coupled to said A/D converter means for storing one of said individual present digital voltage signal representative of one of said individual present voltage signal from one of said plurality of potentiometer means;
   position compare logic means coupled to each of said plurality of register means for computing differences between a successive value stored in each of said plurality of register means and said individual present digital voltage signal stored in each of said plurality of register means and for sending said position interrupt signal when at least one of said differences exceeds a predetermined threshold value;
   a plurality of counter means equal in number to said plurality of register means wherein one of said plurality of counter means is coupled to each individual register means of said plurality of register means for counting down from said present digital voltage signal stored in each of said plurality of register means to an initial value and for producing an output signal when said initial value is obtained;
   zero detection logic means coupled to an output of each of said plurality of counter means for receiving said output signal from each of said plurality of counter means and for outputting said position interrupt signal when any of said plurality of counter means reaches said initial value indicating a change in position of said joystick; and
   edge detection means coupled to said joystick for sending a button interrupt signal when a joystick button changes status.

15. A method of providing an interrupt based positioning system for a joystick comprising the steps of:
   providing a plurality of potentiometer means each of said plurality of potentiometer means coupled to said joystick for supplying an individual present voltage signal representative of a current axial position of said joystick;
   providing multiplexer means coupled to an output of each of said plurality of potentiometer means for sampling each of said individual present voltage signal from each of said plurality of potentiometer means;
   providing analog-to-digital (A/D) converter means coupled to an output of said multiplexer means for converting each of said individual present voltage signal from each of said plurality of potentiometer means to an individual present digital voltage signal;
   providing a plurality of register means equal in number to said plurality of potentiometer means each of said plurality of register means being coupled to said A/D converter means for storing one of said individual present digital voltage signal representative of one of said individual present voltage signal from one of said plurality of potentiometer means;
   providing interrupt generation means coupled to an output of each of said plurality of register means for sending a position interrupt signal when one of said present digital voltage signal stored in one of said plurality of register means indicates a change in position of said joystick.

16. The method of claim 15 wherein said step of providing interrupt generation means for sending a position interrupt signal further comprises the step of providing position compare logic means coupled to each of said plurality of register means for computing differences between a successive value stored in each of said plurality of register means and said individual digital voltage signal stored in each of said plurality of register means and for sending said position interrupt signal when at least one of said differences exceeds a predetermined threshold value.

17. The method of claim 16 further comprising the step of providing edge detection means coupled to said joystick for sending a button interrupt signal when a joystick button changes status.

18. The method of claim 15 further comprising the step of providing a plurality of counter means equal in number to said plurality of register means wherein one of said plurality of counter means is coupled to each individual register means of said plurality of register means for counting down from said present digital voltage signal stored in each of said plurality of register means to an initial value and for producing an output signal to generate said position interrupt signal when said initial value is obtained.

19. The method of claim 18 wherein said step of providing interrupt generation means for sending a position interrupt signal further comprises the step of providing zero detection logic means coupled to an output of each of said plurality of counter means for receiving said output signal from each of said plurality of counter means and for outputting said position interrupt signal when any of said plurality of counter means reaches said initial value indicating a change in position of said joystick.

20. The method of claim 19 further comprising the step of providing edge detection means coupled to said joystick for sending a button interrupt signal when a joystick button changes status.

* * * * *